United States Patent [19]

Fischer et al.

[11] Patent Number: 5,834,550
[45] Date of Patent: Nov. 10, 1998

[54] DULL THERMOPLASTIC MOLDING MATERIAL

[75] Inventors: Wolfgang Fischer, Ludwigshafen; Norbert Güntherberg, Speyer, both of Germany

[73] Assignee: BASF Aktiengesellschaft, Ludwigshafen, Germany

[21] Appl. No.: 763,304

[22] Filed: Dec. 10, 1996

Related U.S. Application Data

[63] Continuation of Ser. No. 550,591, Oct. 31, 1995, abandoned.

[30] Foreign Application Priority Data

Nov. 9, 1994 [DE] Germany ............ 44 39 969.3

[51] Int. Cl.$^6$ .................... C08K 3/26; C08K 3/10; C08L 51/00
[52] U.S. Cl. ................ 524/434; 524/280; 524/399; 524/504; 525/77; 525/79
[58] Field of Search ........... 525/77, 79; 524/399, 524/434, 280, 504

[56] References Cited

U.S. PATENT DOCUMENTS

| | | | |
|---|---|---|---|
| 3,055,859 | 9/1962 | Vollmert | 525/227 |
| 4,612,347 | 9/1986 | Eichenauer et al. | 525/73 |
| 4,668,737 | 5/1987 | Eichenauer et al. | 525/73 |
| 5,158,322 | 10/1992 | Jun | 280/732 |
| 5,252,666 | 10/1993 | Seitz et al. | 525/80 |
| 5,334,471 | 8/1994 | Jacripaute et al. | 430/106.6 |
| 5,367,029 | 11/1994 | Fischer et al. | 525/301 |
| 5,438,099 | 8/1995 | Fischer et al. | 525/67 |

FOREIGN PATENT DOCUMENTS

| | | |
|---|---|---|
| 445 601 | 9/1991 | European Pat. Off. . |
| 450 511 | 10/1991 | European Pat. Off. . |
| 597 275 | 5/1994 | European Pat. Off. . |
| 1 260 135 | 11/1968 | Germany . |
| 34 05 938 | 8/1985 | Germany . |
| 3421 353 | 12/1985 | Germany . |
| 1 224 911 | 3/1971 | United Kingdom . |

Primary Examiner—Mark L. Warzel
Attorney, Agent, or Firm—Keil & Weinkauf

[57] ABSTRACT

Thermoplastic molding materials which contain from 0.1 to 10% by weight of a compound of a polyvalent metal are suitable for the production of dull moldings having high impact strength.

6 Claims, No Drawings

DULL THERMOPLASTIC MOLDING MATERIAL

This application is a continuation of application Ser. No. 08/550,591, filed on Oct. 31, 1995 now abandoned.

The present invention relates to thermoplastic molding materials containing, as essential components, A) 4.9–95% by weight, based on the total weight of the molding material, of a graft polymer of $a_1$) 30–90% by weight, based on A), of an elastomeric grafting base having a glass transition temperature of less than 0° C. and an average particle size ($d_{50}$) of 30–1000 nm, based on $a_{11}$) 50–99.8% by weight, based on $a_1$), of alkyl acrylates where the alkyl radical is of 1 to 8 carbon atoms, dienes or mixtures thereof, $a_{12}$) 0–5% by weight, based on $a_1$), of polyfunctional, crosslinking monomers, $a_{13}$) 0–49.8% by weight, based on $a_1$), of further ethylenically unsaturated, copolymerizable monomers differing from $a_{11}$) and $a_{14}$) and $a_{14}$) 0.1–10% by weight, based on $a_1$), of hydroxyalkyl (meth)acrylates or ethylenically unsaturated monomers containing basic groups or mixtures thereof or $a_{15}$) 0.1–10% by weight of a monomer $a_{23}$), the percentages $a_{11}$) to $a_{15}$) being based on $a_1$), and $a_2$) 10–70% by weight, based on A), of a graft having a glass transition temperature above 25° C., based on $a_{21}$) 0–99.9% by weight of a vinylaromatic monomer, $a_{22}$) 0–99.9% by weight of at least one polar ethylenically unsaturated monomer, $a_{23}$) 0.1–20% by weight of an ethylenically unsaturated monomer containing one or more acidic groups or $a_{24}$) 0.1–20% by weight of a monomer $a_{14}$), B) 4.9–95% by weight, based on the total weight of the molding material, of at least one polymer having a glass transition temperature of more than 25° C., C) 0.1–10% by weight, based on the total weight of the molding material, of compounds of polyvalent metals and D) 0–40% by weight, based on the total weight of the molding material, of conventional additives and processing assistants, with the proviso that, if monomers $a_{14}$) are present in the grafting base, monomers $a_{23}$) are present in the graft and, if monomers $a_{15}$) are present in the grafting base, monomers $a_{24}$) are present in the graft.

The present invention furthermore relates to the use of such molding materials for the production of films and moldings and to the films and moldings thus obtainable.

Particulate graft polymers are frequently used for improving the impact strength of thermoplastics which are sensitive to impact and are brittle as such. The preparation of particulate graft polymers comprising an elastomeric core, ie. a polymer having a glass transition temperature below 0° C., and a graft having a glass transition temperature above 25° C., for example by emulsion polymerization, is known. For this purpose, a grafting base is first prepared by emulsion polymerization of suitable monomers. The monomers which are to form the graft are then polymerized in the presence of the grafting base so that a very large amount is grafted onto the grafting base. The monomers for the graft are preferably chosen so that the latter is compatible with the thermoplastic to be modified. The preparation of such impact modifiers has long been known and is described, for example, in U.S. Pat. No. 3,055,859 and German Patent 1,260,135. It is also known that moldings having dull surfaces can be obtained by mixing certain graft polymers with thermoplastics (EP-A-450 511, DE-A-34 21 353).

Molding materials which have a dull surface and simultaneously have good toughness and whose surface gloss is independent of the processing conditions chosen are particularly required. The binding of the graft to the grafting base is important with regard to the toughness of such particulate graft polymers. In the case of poor binding, the toughening effect is not sufficient, so that only products having low toughness can be obtained. A number of measures have been proposed for improving the binding. EP-A-450 511 describes an improvement of the binding when the grafting base used is a polymer which contains polymerized monomers containing acidic groups and onto which monomers containing basic groups are grafted as the graft. Thermoplastic molding materials prepared therefrom have dull surfaces, but the surface gloss depends to a great extent on the processing conditions. As a further possibility for achieving good toughness, EP-A-445 601 describes the use of hydroxyalkyl acrylate or methacrylate in the grafting base, but no dull products are obtained.

DE-A-3 405 938 describes the use of graft polymers having acidic functions, but only in combination with thermoplastic resins having basic functions. Although these polymer blends have dull surfaces, the toughness achieved is insufficient for many applications.

DE-A-3 421 353 describes graft polymers in which acids or bases or acids and bases simultaneously are incorporated as polymerized units in the graft. However, the gloss of these products depends on the processing conditions.

It is an object of the present invention to provide thermoplastic molding materials which can be processed to give dull moldings and have a surface gloss independent of the processing conditions.

We have found that this object is achieved, according to the invention, by the thermoplastic molding materials as claimed in claim 1.

Preferred thermoplastic molding materials are described in the subclaims.

The novel thermoplastic molding materials contain, as component A), from 4.9 to 95, preferably from 10 to 74.9, in particular from 15 to 50, % by weight of a graft polymer comprising an elastomeric grafting base $a_1$) and at least one graft $a_2$).

The grafting base $a_1$) has a glass transition temperature of less than 0° C., preferably less than –10° C., and a particle size (average value $d_{50}$) of from 30 to 1000 nm, preferably from 50 to 800 nm, particularly preferably from 80 to 600 nm. The average value $d_{50}$ is the median particle size, above and below which are the diameters of 50% by weight of the particles.

The grafting base $a_1$) is composed of monomers $a_{11}$), $a_{12}$), $a_{13}$) and $a_{14}$), which are described in detail below.

Alkyl acrylates of 1 to 8 carbon atoms or dienes or mixtures thereof may be used as monomers $a_{11}$), the amount of which is from 50 to 99.8, preferably from 60 to 99, % by weight, based on $a_1$). Preferred alkyl acrylates are those of 4 to 8 carbon atoms, in particular ethyl, n-butyl and 2-ethylhexyl acrylate. Mixtures of different alkyl acrylates can of course also be used.

The alkyl acrylates may be completely or partially replaced by dienes, in particular 1,3-butadiene and isoprene.

Where predominantly or entirely alkyl acrylates are used, it is frequently advantageous to employ polyfunctional, crosslinking monomers in amounts of up to 5, preferably from 0.2 to 4, in particular from 0.5 to 3, % by weight, based on $a_1$), as component $a_{12}$), in order to achieve good mechanical properties. These may be in principle any desired monomers which contain at least two ethylenic double bonds not conjugated in the 1,3 position. Examples are divinylbenzene, diallyl maleate, diallyl fumarate, allyl methacrylate, triallyl cyanurate, triallyl isocyanurate, the acrylate of tricyclodecenyl alcohol, diallyl phthalate and dihydrodicyclopentadienyl acrylate, of which the three last-mentioned are preferred.

In the preparation of the grafting base, up to 49.8, preferably from 3 to 45, in particular from 5 to 40, % by weight of further ethylenically unsaturated, copolymerizable monomers differing from $a_{11}$) and $a_{14}$) may be used as component $a_{13}$). Alkyl methacrylates of 1 to 8 carbon atoms, vinyl alkyl ethers where the alkyl radical is of 1 to 8 carbon atoms, styrene and styrene substituted in the nucleus and maleic anhydride and mixtures thereof are mentioned here merely by way of example.

The presence of hydroxyalkyl (meth)acrylates and/or ethylenically unsaturated monomers containing basic groups or mixtures thereof ($a_{14}$), in particular in combination with the monomers $a_{23}$) described further below, in the graft improves the binding of the graft to the grafting base.

The same applies to the combination of the monomers $a_{15}$) with $a_{24}$) in the graft, which monomers can be used in the grafting base.

Preferred hydroxyalkyl (meth)acrylates are those where the alkyl radical is of 1 to 8, in particular 2 to 6, carbon atoms, such as 2-hydroxyethyl acrylate, 2-hydroxyethyl methacrylate and 4-hydroxybutyl acrylate.

Particularly preferred examples of monomers having basic groups are those having tertiary amino groups. Examples are dimethylaminoethyl (meth)acrylate, morpholine methacrylate, N-vinylimidazole, p-dimethylaminostyrene, N-vinylcarbazole, 3-vinylpyridine, 4-vinylpyridine, and mixtures thereof. Particularly preferred monomers are esters of acrylic acid or methacrylic acid with aliphatic alcohols which contain a tertiary amino group in the alkyl radical, eg. dimethylaminoethyl (meth)acrylate. Examples of monomers $a_{15}$) are given further below in the description of component $a_{23}$).

The graft copolymer can be prepared by the method described in German Patent 1,260,135. For this purpose, the grafting base $a_1$) is first prepared. If the grafting base is to be an acrylate rubber, the acrylate or acrylates $a_{11}$), the polyfunctional monomer $a_{12}$) and the hydroxyalkyl acrylate or methacrylate or monomers having basic groups $a_{14}$) are polymerized in aqueous emulsion at from 20° to 100° C., preferably from 50° to 80° C. The usual emulsifiers, such as the alkali metal salts of alkanesulfonic or alkylarylsulfonic acids, alkylsulfates, fatty alcohol sulfonates, salts of higher fatty acids of 10 to 30 carbon atoms or resin soaps, may be used. The sodium salts of alkanesulfonates or of fatty acids of 10 to 18 carbon atoms are preferably used. It is advantageous to use the emulsifiers in an amount of from 0.5 to 5, in particular from 1 to 2, % by weight, based on the total weight of the monomers used for the preparation of the grafting base. In general, a water/monomer ratio of from 2:1 to 0.7:1 is used. The polymerization initiators employed are in particular the conventional persulfates, eg. potassium peroxodisulfate; however, redox systems are also suitable. The amount of initiators (eg. from 0.1 to 1% by weight, based on the total weight of the monomers) depends in a known manner on the desired molecular weight.

The polymerization assistants used may be the conventional buffer substances, by means of which a pH of, preferably, from 6 to 9 is established, eg. sodium bicarbonate and sodium pyrophosphate, and up to 3% by weight of a molecular weight regulator, such as mercaptan, terpinol or dimeric alpha-methylstyrene.

The exact polymerization conditions, in particular the type, metering and amount of the emulsifier, are determined within the abovementioned ranges so that the resulting latex of the crosslinked acrylate polymer has a $d_{50}$ value of from about 30 to 1000 nm, preferably from 50 to 800 nm. The $d_{50}$ value of the particle size is defined in the usual manner as the weight average particle size as determined by means of an analytical ultracentrifuge by the method of W. Scholtan and H. Lange, Kolloid-Z. und Z.-Polymere 250 (1972), 782–796.

If the grafting base is to be a diene rubber, it is advantageous to polymerize $a_{11}$) and $a_{13}$) alone, or if necessary together with the further comonomers $a_{12}$), in aqueous emulsion in a manner known per se, at from 20° to 100° C., preferably from 50° to 80° C., as described above.

The exact polymerization conditions, in particular the type, metering and amount of the emulsifier, are advantageously chosen for diene rubbers within the abovementioned range so that the resulting latex of the polymer $a_1$) has a $d_{50}$ value (cf. above) of from about 100 to 750 nm, preferably from 100 to 600 nm. It is also possible to agglomerate an emulsion polymer having average particle sizes of from 60 to 150 nm in a known manner (cf. German Published Application DAS 2,427,960).

The graft $a_2$) of the graft polymers A has a glass transition temperature of more than 25° C. and is based on $a_{21}$) from 0 to 99.9, preferably from 10 to 89.9, in particular from 30 to 79.7, % by weight of a vinylaromatic monomer, $a_{22}$) from 0 to 99.9, preferably from 10 to 89.8, in particular from 20 to 69.9, % by weight of a polar ethylenically unsaturated monomer and $a_{23}$) from 0.1 to 20, preferably from 0.5 to 10, % by weight of a monomer containing one or more acidic groups and differing from $a_{22}$) or $a_{24}$) from 0.1 to 20, preferably from 0.5 to 10, % by weight of a monomer $a_{14}$).

Preferred vinylaromatic monomers $a_{21}$) are styrene and substituted styrenes of the general formula I

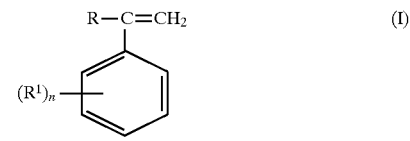

where R is alkyl of 1 to 8 carbon atoms, hydrogen or halogen, $R^1$ is alkyl of 1 to 8 carbon atoms or halogen and n is 0, 1, 2 or 3.

Styrene, α-methylstyrene and p-methylstyrene may be mentioned as specific examples here.

The monomers $a_{22}$) are not subject per se to any special restriction, but acrylonitrile, methacrylonitrile and (meth) acrylates where the alkyl radical is of 1 to 4 carbon atoms are particularly preferred. Acrylonitrile and methyl methacrylate and mixtures thereof have proven particularly suitable.

Particularly suitable acidic groups for the monomers $a_{23}$) are carboxyl, phosphoric acid and/or sulfo groups. α,β-unsaturated carboxylic acids, such as acrylic acid, methacrylic acid, citraconic acid, crotonic acid, fumaric acid, itaconic acid, maleic acid, vinylsulfonic acid, vinylbenzenesulfonic acid, vinylphosphoric acid and cinnamic acid and, in the case of dicarboxylic acids such as fumaric acid and maleic acid, their half-esters and semiamides may be mentioned by way of example.

Examples of monomers $a_{24}$) have already been given in the description of component $a_{14}$) for the grafting base.

For the preparation of the graft copolymer A, the monomer mixture comprising $a_{21}$), $a_{22}$) and $a_{23}$) is polymerized in the presence of the grafting base $a_1$).

It is advantageous to carry out the graft copolymerization onto 35 the polymer serving as a grafting base $a_1$), once again in aqueous emulsion. It may be carried out in the same system as the polymerization of the grafting base, and further emulsifier and initiator may be added. These need not be identical to the emulsifiers and initiators used for the preparation of the grafting base $a_1$). For example, it may be advantageous to use a persulfate as initiator for the preparation of the grafting base $a_1$) but to employ a redox initiator system for polymerizing the graft $a_2$). Otherwise, the statements made in connection with the preparation of the grafting base $a_1$) are applicable to the choice of emulsifier, initiator and polymerization assistants. The monomer mixture to be grafted on may be added to the reaction mixture all at once, batchwise in a plurality of stages or, preferably, continuously during the polymerization. The graft copolymerization is controlled so that in general a degree of grafting of from 10 to 60, preferably from 15 to 45, % by weight results.

The novel thermoplastic molding materials contain, as component B, from 4.9 to 95, preferably from 25 to 90, in particular from 50 to 84.9, % by weight of one or more polymers having a glass transition temperature of more than 25° C.

Examples of suitable thermoplastics B are untoughened or toughened polymethyl methacrylate and in particular copolymers of a vinylaromatic monomer and a polar, copolymerizable, ethylenically unsaturated monomer, which are untoughened or toughened. Here too, suitable vinylaromatic and polar, copolymerizable, ethylenically unsaturated monomers are those stated as $a_{21}$) and $a_{22}$) in connection with the preparation of the graft. Particularly preferred thermoplastics B are styrene/acrylonitrile and a-methylstyrene/acrylonitrile copolymers.

Other toughened thermoplastics, such as blends of polycarbonate/ABS, polycarbonate/ASA, PMMA/ASA, polyphenylene ether/impact-resistant polystyrene, impact-resistant PVC, ABS and ASA, may also be used as component B.

An important component of the novel thermoplastic molding materials is component C, ie. compounds of polyvalent metals. In general, a large number of compounds of polyvalent metals are in principle suitable; owing to their easy accessibility, however, compounds of the alkaline earth metals, of zinc, of aluminum and of tin and compounds of the metals of subgroup VIII of the Periodic Table are preferably used. Both inorganic (carbonates, sulfates, phosphates) and organic (carboxylic acid salts) compounds of these metals may be used. Examples which have proven particularly useful in practice are zinc carbonate, zinc acetate and zinc stearate.

The time when the component C is added is not critical; the addition may be effected as early as during the preparation of the graft polymer or not until during mixing of the components A and B.

In addition to the components A to C, the novel thermoplastic molding materials may also contain up to 40, preferably up to 20, % by weight of conventional additives and processing assistants. Examples of these are fillers, further compatible polymers, antistatic agents, antioxidants, flame-proofing agents, lubricants; dyes and pigments. Appropriate products are known per se to a person skilled in the art and are described in the literature, so that no further information is necessary here.

The novel thermoplastic molding materials can be prepared by mixing the components (if necessary after isolation of the graft polymer from the emulsion if the preparation was carried out by emulsion polymerization), by extruding, kneading or milling them together. The component C may be added as early as during the preparation of the graft polymer A or during mixing of A and B and, if required, D.

The novel thermoplastic molding materials can be processed by the methods usually used for processing thermoplastics, for example extrusion and injection molding, to give a very wide range of moldings, such as window profiles, garden furniture, boats, sign plates, lamp covers, automotive parts, housings for electrical and household appliances and toys. The novel thermoplastic molding materials are particularly suitable for the production of dull moldings which are required to have high impact strength.

In the Examples which follow, parts and percentages are by weight, unless stated otherwise.

EXAMPLES 1 TO 14

1. Preparation of the Grafting Base $a_1$)

a) The preparation of the particular acrylate-based grafting base ($a_{11}$), $a_{13}$), $a_{14}$)) was carried out according to the following general method:

160 g of the monomer mixtures stated in Table 1 for the preparation of the grafting base $a_1$), in 1500 g of water, were heated to 65° C. while stirring, with the addition of 5 g of the sodium salt of a $C_{12}$- to $C_{18}$-paraffinsulfonic acid, 3 g of potassium peroxodisulfate, 3 g of sodium bicarbonate and 1.5 g of sodium pyrophosphate. 10 minutes after initiation of the polymerization reaction, a further 840 g of the mixture stated in Table 1 were added in the course of 3 hours. After the end of the monomer addition, the emulsion was kept at 65° C. for a further hour.

b) The preparation of the particular butadiene-based grafting base ($a_{11}$), $a_{12}$), $a_{14}$)) was carried out according to the following method:

A polybutadiene latex was prepared at 65° C. by polymerizing 600 g of the monomer mixture, stated in Table 2 for the preparation of the grafting base, in the presence of a solution of 6 g of tert-dodecyl mercaptan, 7 g of sodium $C_{14}$-alkanesulfonate as emulsifier, 2 g of potassium peroxodisulfate and 2 g of sodium pyrophosphate in 800 ml of water. The conversion was 98%. A latex whose average particle size was 100 nm was obtained. The resulting latex was agglomerated by adding 25 g of an emulsion of a copolymer of 96 parts of ethyl acrylate and 4 parts of methacrylamide having a solids content of 10% by weight, a polybutadiene latex having an average particle size of 350 nm being formed.

2. Preparation of the Particulate Graft Polymers a) 2100 g of the emulsion prepared by the above method (1a) were mixed with 1150 g of water, 2.7 g of potassium peroxodisulfate and, if required, 13.2 g of compound C ($ZnCO_3$ or $Zn(AcO)_2$) and the stirred mixture was heated to 65° C. After the reaction temperature had been reached, 660 g of the monomer mixture stated in Table 1 for the preparation of the graft $a_2$) were metered in over 3 hours. After the end of the addition, the emulsion was kept at 65° C. for a further 2 hours. The graft polymer was precipitated from the emulsion by means of calcium chloride solution at 95° C., washed with water and dried in a warm air stream.

b) After the addition of 400 g of water, 4 g of sodium $C_{14}$-alkanesulfonate, 2 g of potassium peroxodisulfate and, if required, 8 g of compound C ($ZnCO_3$ or $Zn(AcO)_2$) to the grafting base prepared by method (1b) above, 400 g of the monomer mixture stated in Table 2 for the preparation of the graft $a_2$) were added in the course of 4 hours. The polymerization was carried out while stirring the batch at 75° C. The conversion was virtually quantitative, based on the graft monomers. The graft rubber emulsion obtained was precipitated by means of magnesium sulfate solution, and the graft copolymer isolated was washed with distilled water and dried.

3. Mixing With Component B

For the preparation of the blends, a styrene/acrylonitrile copolymer having an acrylonitrile content of 35% and a viscosity number of 80 ml/g (measured in 0.5% strength by weight solution in dimethylformamide at 25° C.) was used as component B. The precipitated and dried graft copolymer from (2) was mixed with component B in an extruder at 260° C. so that the resulting mixture had a graft polymer content of 30%. Shaped articles were produced from this mixture by injection molding.

4. Tests

The notched impact strength was tested on standard small bars having a milled notch according to DIN 53453. The gloss measurement was carried out on circular disks at an angle of 45° (reflection) using a goniophotometer GP 2 from C. Zeiss.

AN=Acrylonitrile

BA=Butyl acrylate

C=Compound as claimed in claim 1, amount in % by weight, based on $a_2$)

DCPA=Acrylate of tricyclodecenyl alcohol

HEA=2-Hydroxyethyl acrylate

S=Styrene

MAS=Methacrylic acid $Zn(AcO)_2$=Zinc acetate

TABLE 1

| | Grafting base $a_1$)[1] | | | Graft $a_2$)[2] | | | | Notched impact strength at RT [kJ/m$^2$] | Gloss[3] | |
|---|---|---|---|---|---|---|---|---|---|---|
| Ex. | BA | DCPA | HEA | S | AN | MAS | C | | a) | b) |
| 1 | 96.5 | 2 | 1.5 | 74 | 23 | 1 | 2 ZnCO$_3$ | 11.0 | 19 | 23 |
| 2 | 96.5 | 2 | 1.5 | 74 | 23 | 1 | 2 Zn(AcO)$_2$ | 11.2 | 22 | 25 |
| 3 | 96.5 | 2 | 1.5 | 75 | 24 | 1 | 2 ZnCO$_3$[5] | 10.4 | 16 | 21 |
| 4 | 96.5 | 2 | 1.5 | 75 | 24 | 1 | 2 Zn(AcO)$_2$[6] | 10.7 | 12 | 16 |
| 5V[4] | 96.5 | 2 | 1.5 | 75 | 24 | 1 | — | 11.2 | 19 | 43 |
| 6V[4] | 96.5 | 2 | 1.5 | 75 | 25 | — | — | 6.5 | 62 | 57 |
| 7V[4] | 98 | 2 | — | 75 | 25 | — | — | 4.1 | 63 | 60 |

[1]Composition of the monomer mixture used for preparing the grafting base $a_1$)
[2]Composition of the monomer mixture used for preparing the graft $a_2$)
[3]45° gloss determined on moldings obtained from molding materials which were mixed using a) weak and b) strong shearing conditions
[4]Comparative experiments
[5]Addition of 2% by weight, based on the total molding material, of zinc carbonate during mixing with polymer B
[6]Addition of 2% by weight, based on the total molding material, of zinc acetate during mixing with polymer B

TABLE 2

| | Grafting base $a_1$) | | Graft $a_2$) | | | | Notched impact strength at RT [kJ/m$^2$] | Gloss[3] | |
|---|---|---|---|---|---|---|---|---|---|
| Ex. | Bu | HEA | S | AN | MAS | CO$_3$ | | a) | b) |
| 8 | 99 | 1 | 68 | 29 | 1 | 2 ZnCo$_3$ | 12.8 | 19 | 22 |
| 9 | 99 | 1 | 68 | 29 | 1 | 2 Zn(AcO)$_2$ | 12.1 | 20 | 29 |
| 10 | 99 | 1 | 69 | 30 | 1 | 2 ZnCO$_3$[5] | 13.1 | 22 | 27 |
| 11 | 99 | 1 | 69 | 30 | 1 | 2 Zn(AcO)$_2$[6] | 12.5 | 25 | 30 |
| 12V[4] | 99 | 1 | 69 | 30 | 1 | — | 13.0 | 23 | 42 |

TABLE 2-continued

| Ex. | Grafting base $a_1$) | | Graft $a_2$) | | | | Notched impact strength at RT [kJ/m²] | Gloss[3] | |
|---|---|---|---|---|---|---|---|---|---|
| | Bu | HEA | S | AN | MAS | CO₃ | | a) | b) |
| 13V[4] | 99 | 1 | 70 | 30 | — | — | 10.7 | 61 | 67 |
| 14V[4] | 100 | — | 70 | 30 | — | — | 11.0 | 65 | 62 |

[1] Composition of the monomer mixture used for preparing the grafting base $a_1$)
[2] Composition of the monomer mixture used for preparing the graft $a_2$)
[3] 45° gloss determined on moldings obtained from molding materials which were mixed using a) weak and b) strong shearing conditions
[4] Comparative experiments
[5] Addition of 2% by weight, based on the total molding material, of zinc carbonate during mixing with polymer B
[6] Addition of 2% by weight, based on the total molding material, of zinc acetate during mixing with polymer B AN=Acrylonitrile
Bu=Butadiene
C=Compound as claimed in claim 1, amount in % by weight, based on $a_2$)
DCPA=Acrylate of tricyclodecenyl alcohol
HEA=2-Hydroxyethyl acrylate
S=Styrene
MAS=Methacrylic acid
Zn(AcO)₂=Zinc acetate

EXAMPLES 15 TO 26

1. Preparation of the Grafting Base $a_1$)

This was carried out as described in Examples 1 to 14, except that, instead of hydroxyethyl acrylate, dimethylaminoethyl acrylate was used as monomer $a_{14}$).

2. Preparation of the Particulate Graft Polymers

This was carried out as described in Examples 1 to 14.

3. Mixing with component B

For the preparation of the blends, a styrene/acrylonitrile copolymer having an acrylonitrile content of 35% and a viscosity number of 80 ml/g was used as component B. The precipitated and dried graft copolymer from (2) was mixed with the hard component in an extruder at 260° C. so that the resulting mixture had a graft polymer content of 50%. Shaped articles were produced from this mixture by injection molding.

4. Tests

The notched impact strength was tested on standard small bars having a milled notch according to DIN 53453. The gloss measurement was carried out on circular disks at an angle of 45° (reflection) using a goniophotometer GP 2 from C. Zeiss.

TABLE 3

| Ex. | Grafting base $a_1$)[1] | | | Graft $a_2$)[3] | | | | Notched impact strength at RT [kJ/m²] | Gloss[3] | |
|---|---|---|---|---|---|---|---|---|---|---|
| | BA | DCPA | DMAEA | S | AN | MAS | C | | a) | b) |
| 15 | 97 | 2 | 1 | 74 | 23 | 1 | 2 ZnCO₃ | 24 | 9 | 15 |
| 16 | 97 | 2 | 1 | 74 | 23 | 1 | 2 Zn(AcO)₂ | 22 | 14 | 20 |
| 17 | 97 | 2 | 1 | 75 | 24 | 1 | 2 ZnCO₃[5] | 23 | 16 | 21 |
| 18 | 97 | 2 | 1 | 75 | 24 | 1 | 2 Zn(AcO)₂[6] | 20 | 12 | 16 |
| 19V[4] | 97 | 2 | 1 | 75 | 24 | 1 | — | 23 | 11 | 45 |
| 20V[4] | 98 | 2 | 1 | 75 | 25 | — | — | 11 | 65 | 60 |

[1] Composition of the monomer mixture used for preparing the grafting base $a_1$)
[2] Composition of the monomer mixture used for preparing the graft $a_2$)
[3] 45° gloss determined on moldings obtained from molding materials which were mixed using a) weak and b) strong shearing conditions
[4] Comparative experiments
[5] Addition of 2% by weight, based on the total molding material, of zinc carbonate during mixing with polymer B
[6] Addition of 2% by weight, based on the total molding material, of zinc acetate during mixing with polymer B AN=Acrylonitrile
BA=Butyl acrylate
C=Component C as claimed in claim 1, amount in % by weight, based on $a_2$)
DCPA=Acrylate of tricyclodecenyl alcohol
DMAEA=Dimethylaminoethyl acrylate S=Styrene MAS=Methacrylic acid $Zn(AcO)_2$=Zinc acetate monomer $a_{23}$), dimethylaminoethyl acrylate was used as monomer $a_{24}$) in the graft.

TABLE 4

| Ex. | Grafting base $a_1$)[1] | | Graft $a_2$)[2] | | | | Notched impact strength at RT [kJ/m²] | Gloss[3] | |
|---|---|---|---|---|---|---|---|---|---|
| | Bu | DMAEA | S | AN | MAS | C | | a) | b) |
| 21 | 99 | 1 | 68 | 29 | 1 | 2 $ZnCO_3$ | 24 | 15 | 24 |
| 22 | 99 | 1 | 68 | 29 | 1 | 2 $Zn(AcO)_2$ | 23 | 22 | 31 |
| 23 | 99 | 1 | 69 | 30 | 1 | 2 $ZnCO_3$[5] | 21 | 13 | 19 |
| 24 | 99 | 1 | 69 | 30 | 1 | 2 $Zn(AcO)_2$[6] | 22 | 20 | 28 |
| 25V[4] | 99 | 1 | 69 | 30 | 1 | — | 22 | 23 | 47 |
| 26V[4] | 100 | — | 70 | 30 | — | — | 18 | 61 | 64 |

[1] Composition of the monomer mixture used for preparing the grafting base $a_1$)
[2] Composition of the monomer mixture used for preparing the graft $a_2$)
[3] 45° gloss determined on moldings obtained from molding materials which were mixed using a) weak and b) strong shearing conditions
[4] Comparative experiments
[5] Addition of 2% by weight, based on the total molding material, of zinc carbonate during mixing with polymer B
[6] Addition of 2% by weight, based on the total molding material, of zinc acetate during mixing with polymer B AN=Acrylonitrile Bu=Butadiene C=Compound as claimed in claim 1, amount in % by weight, based on $a_2$)

DMAEA=Dimethylaminoethyl acrylate

S=Styrene

MAS=Methacrylic acid $Zn(AcO)_2$=Zinc acetate

EXAMPLES 27 TO 38

1. Preparation of the Grafting Base

This was carried out as described in Examples 1 to 26, except that, instead of a monomer $a_{14}$), methacrylic acid was used as monomer $a_{15}$) in the grafting base and, instead of a 2. Preparation of the Particulate Graft Copolymers This was carried out as described in Examples 1 to 26.

3. Mixing with Component B

This was carried out as described in Examples 1 to 14.

4. Tests

This was carried out as described in Examples 1 to 26.

TABLE 5

| Ex. | Grafting base $a_1$)[1] | | | Graft $a_2$)[2] | | | | Notched impact strength at RT [kJ/m²] | Gloss[3] | |
|---|---|---|---|---|---|---|---|---|---|---|
| | BA | DCPA | MAS | S | AN | DMAEA | C | | a) | b) |
| 27 | 97 | 2 | 1 | 73 | 23 | 2 | 2 $ZnCO_3$ | 21 | 7 | 12 |
| 28 | 97 | 2 | 1 | 73 | 23 | 2 | 2 $Zn(AcO)_2$ | 23 | 11 | 17 |
| 29[5] | 97 | 2 | 1 | 74 | 24 | 2 | — | 21 | 13 | 16 |
| 30[6] | 97 | 2 | 1 | 74 | 24 | 2 | — | 23 | 12 | 19 |
| 31V[4] | 97 | 2 | 1 | 74 | 24 | 2 | — | 22 | 11 | 35 |
| 32V[4] | 98 | 2 | — | 75 | 25 | — | — | 11 | 65 | 60 |

[1] Composition of the monomer mixture used for preparing the grafting base $a_1$)
[2] Composition of the monomer mixture used for preparing the graft $a_2$)
[3] 45° gloss determined on moldings obtained from molding materials which were mixed using a) weak and b) strong shearing conditions
[4] Comparative experiments
[5] Addition of 2% by weight, based on the total molding material, of zinc carbonate during mixing with polymer B
[6] Addition of 2% by weight, based on the total molding material, of zinc acetate during mixing with polymer B AN=Acrylonitrile
BA=Butyl acrylate
C=Compound as claimed in claim 1, amount in % by weight, based on $a_2$)
DCPA=Acrylate of tricyclodecenyl alcohol
DMAEA=Dimethylaminoethyl acrylate
S=Styrene
MAS=Methacrylic acid
$Zn(AcO)_2$=Zinc acetate

TABLE 6

| Ex. | Grafting base $a_1$)[1] | | Graft $a_2$)[2] | | | | Notched impact strength at RT [kJ/m$^2$] | Gloss[3] | |
|---|---|---|---|---|---|---|---|---|---|
| | Bu | MAS | S | AN | DMAEA | C | | a) | b) |
| 33 | 99 | 1 | 68 | 29 | 1 | 2 $ZnCO_3$ | 24 | 13 | 21 |
| 34 | 99 | 1 | 68 | 29 | 1 | 2 $Zn(AcO)_2$ | 23 | 18 | 27 |
| 35[5] | 99 | 1 | 69 | 30 | 1 | — | 22 | 13 | 19 |
| 36[6] | 99 | 1 | 69 | 30 | 1 | — | 21 | 22 | 30 |
| 37V[4] | 99 | 1 | 69 | 30 | 1 | — | 22 | 23 | 41 |
| 38V[4] | 100 | — | 70 | 30 | — | — | 18 | 59 | 63 |

[1]Composition of the monomer mixture used for preparing the grafting base $a_1$)
[2]Composition of the monomer mixture used for preparing the graft $a_2$)
[3]45° gloss determined on moldings obtained from molding materials which were mixed using a) weak and b) strong shearing conditions
[4]Comparative experiments
[5]Addition of 2% by weight, based on the total molding material, of zinc carbonate during mixing with polymer B
[6]Addition of 2% by weight, based on the total molding material, of zinc acetate during mixing with polymer B AN=Acrylonitrile
Bu=Butadiene
C=Compound as claimed in claim 1, amount in % by weight, based on $a_2$)
DMAEA=Dimethylaminoethyl acrylate
S=Styrene
AS=Methacrylic acid
$Zn(AcO)_2$=Zinc acetate

We claim:

1. A thermoplastic molding material containing, as essential components,

A) 4.9–95% by weight, based on the total weight of the molding material, of a graft polymer of a) 30–90% by weight, based on A), of an elastomeric grafting base having a glass transition temperature of less than 0° C. and an average particle size ($d_{50}$) of 30–1000 nm, based on $a_{11}$) 50–99.8% by weight, based on $a_1$), of alkyl acrylates where the alkyl radical is of 1 to 8 carbon atoms, dienes or mixtures thereof, $a_{12}$) 0–5% by weight, based on $a_1$), of polyfunctional, crosslinking monomers, $a_{13}$) 0–49.8% by weight, based on $a_1$), of further ethylenically unsaturated, copolymerizable monomers differing from $a_{11}$) and $a_{14}$) and $a_{14}$) 0.1–10% by weight, based on $a_1$), of hydroxyalkyl (meth)acrylates or ethylenically unsaturated monomers containing basic groups or mixtures thereof or $a_{15}$) 0.1–10% by weight of a monomer $a_{23}$), the percentages $a_{11}$) to $a_{15}$) being based on $a_1$), and $a_2$) 10–70% by weight, based on A), of a graft having a glass transition temperature above 25° C. based on $a_{21}$) 0–99.9% by weight of a vinylaromatic monomer, $a_{22}$) 0–99.9% by weight of at least one polar ethylenically unsaturated monomer, $a_{23}$) 0.1–20% by weight of an ethylenically unsaturated monomer containing one or more acidic groups or $a_{24}$) 0.1–20% by weight of a monomer $a_4$), B) 4.9–95% by weight based on the total weight of the molding material, of at least one polymer having a glass transition temperature of more than 25° C., C) 0.1–10% by weight, based on the total weight of the molding material, of zinc carbonate, zinc acetate or a mixture thereof and D) 0–40% by weight, based on the total weight of the molding material, of conventional additives and processing assistants, with the proviso that, if monomers $a_{14}$) are present in the grafting base, monomers $a_{23}$) are present in the graft and, if monomers $a_{15}$) are present in the grafting base, monomers $a_{24}$) are present in the graft which dull surface is independent of the processing conditions.

2. A thermoplastic molding material as claimed in claim 1, wherein the elastomeric grafting base contains $a_{11}$) 85–99.8% by weight of an alkyl acrylate where the alkyl radical is of 1 to 8 carbon atoms, $a_{13}$) 0.1–5% by weight of at least one polyfunctional, crosslinking monomer and $a_{14}$) 0.1–10% by weight of a hydroxyalkyl (meth)acrylate or ethylenically unsaturated monomers containing basic groups or mixtures thereof.

3. A thermoplastic molding material as claimed in claim 1, wherein the elastomeric grafting base $a_1$) is composed of $a_{11}$) 50–99.8% by weight of a diene, $a_{12}$) 0–49.9% by weight of further ethylenically unsaturated, copolymerizable monomers differing from $a_{11}$) and $a_{14}$) and $a_{14}$) 0.1–10% by weight of a hydroxyalkyl (meth)acrylate or ethylenically unsaturated monomers containing basic groups or mixtures thereof.

4. A molding obtained from a thermoplastic molding material as claimed in claim 1 as an essential component.

5. In a method for the molding of thermoplastic molding material, the improvement wherein the molding material is that of claim 1 resulting in a dull surface of the molded material.

6. A thermoplastic molding material as claimed in claim 1, wherein the component c is zinc carbonate.

* * * * *

UNITED STATES PATENT AND TRADEMARK OFFICE
CERTIFICATE OF CORRECTION

PATENT NO.: 5,834,550

DATED: November 10, 1998

INVENTOR(S): FISCHER et al.

It is certified that error appears in the above-identified patent and that said Letters Patent is hereby corrected as shown below:

Col. 13, claim 1, line 51, "a)" should be --$a_1$)--.

Col. 14, claim 1, line 11, "$a_4$)" should be --$a_{14}$)--.

Signed and Sealed this

Twenty-third Day of March, 1999

Attest:

Q. TODD DICKINSON

*Attesting Officer*  *Acting Commissioner of Patents and Trademarks*